United States Patent [19]

Ozawa et al.

[11] Patent Number: 5,628,036
[45] Date of Patent: May 6, 1997

[54] FOCUS ADJUSTMENT DEVICE AND METHOD

[75] Inventors: Masamitsu Ozawa, Kawasaki; Shigeyuki Uchiyama, Tokyo; Toshimi Watanabe, Yokohama, all of Japan

[73] Assignee: Nikon Corporation, Tokyo, Japan

[21] Appl. No.: 496,662

[22] Filed: Jun. 29, 1995

[30] Foreign Application Priority Data

Sep. 7, 1994 [JP] Japan ................................. 6-214065

[51] Int. Cl.$^6$ .............................. G03B 3/00; G03B 3/10
[52] U.S. Cl. ................................. 396/102; 396/95
[58] Field of Search .......................... 354/402, 406, 354/407, 408, 400; 396/102

[56] References Cited

U.S. PATENT DOCUMENTS

| | | | |
|---|---|---|---|
| 4,855,776 | 8/1989 | Akashi | 354/402 |
| 5,227,828 | 7/1993 | Kirigaya | 354/400 |
| 5,448,051 | 9/1995 | Yamano | 250/201.2 |
| 5,457,513 | 10/1995 | Uenaka | 354/400 |
| 5,502,537 | 3/1996 | Utagawa | 354/402 |
| 5,517,275 | 5/1996 | Kusaka et al. | 354/402 |

FOREIGN PATENT DOCUMENTS 60-37513  2/1985  Japan.
5-346536  12/1993  Japan.

*Primary Examiner*—Safet Metjahic
*Assistant Examiner*—Eric Nelson
*Attorney, Agent, or Firm*—Oliff & Berridge

[57] ABSTRACT

A focus adjustment device that eliminates unnecessary driving of a shooting lens after the shooting lens has already been driven near to an in-focus position. In a focus adjustment device, information related to the defocus amount of the shooting lens is detected based on output signals corresponding to the light intensity distribution of a object image from a pair of photo-electric conversion arrays. The focus adjustment device includes a focus detection circuit to determine the confidence level of the detected information based on predetermined determination criteria and a lens driving device to drive the shooting lens based on the detected information when the information of the focus detection device is accepted as having a sufficient confidence level. However, to prevent erroneous driving of the lens, such as when the object moves out of a focusing field or when the object reverses direction, the probability of rejecting the information of the focus detection on the basis of an insufficient confidence level increases. This occurs when information indicating that the occurrence of a defocus amount exceeding a predetermined range is detected by the focus detection circuit after the shooting lens has previously been determined to have been driven within permissible parameters of an in-focus position.

20 Claims, 6 Drawing Sheets

FOCUS ADJUSTMENT DEVICE AND METHOD

BACKGROUND OF THE INVENTION

1. Field of the Invention

The present invention relates to focus detection operations of a focus detection device. More particularly, the invention relates to a focus adjustment device that eliminates unnecessary driving of a shooting lens after the shooting lens has already been driven near to an in-focus position.

2. Description of Related Art

One of the known focus detection methods of an autofocus detection device in a camera is the phase difference detection method. In this method, two images of an object with parallax are guided to a pair of photo-electric conversion element arrays. An in-focus condition is determined by computing the relative shift amount of the two images based on an image output from each photo-electric conversion element array.

Hereafter, this phase difference detection method will be explained with reference to FIG. 4. Light rays passing through region 21 of a shooting lens 1 focus on a film equivalent plane 6. The light rays then pass through, in order, a band pass filter 7, a vision mask 2, a field lens 3, a stop aperture unit 41, and a re-imaging lens 51 of a focus detection optical system 8 and form a secondary image on a sensor array 9A of an image sensor 9. Similarly, light rays passing through region 31 of the shooting lens 1, after focusing on the film equivalent plane 6, pass, in order, the band pass filter 7, the vision mask 2, the field lens 3, a stop aperture unit 42, and a re-imaging lens 52 of the focus detection optical system 8 and form a secondary image on a sensor array 9B of the image sensor 9.

A focus detection region is a section of the assembly near a predicted focus plane where the sensor arrays 9A and 9B of the image sensor 9 overlap each other, with the image being invertedly projected by the focus detection optical system 8.

The size of region 21 of the shooting lens 1 is the same as an inverted projected image formed by the field lens 3 of the stop aperture unit 41. Likewise, the size of region 31 of the shooting lens 1 is the same as an inverted projected image formed by the field lens 3 of the stop aperture unit 42. The secondary images of the pair of object images formed by the focus detection optical system 8 on sensor arrays 9A and 9B move away from each other in a so-called front focus condition when the shooting lens 1 forms a clear image of the object in front of a predicted focus plane. Conversely, the secondary images move towards each other in a so-called rear focus condition when the shooting lens 1 forms a clear image of the object to the rear of the predicted focus plane. The secondary images on the sensor arrays 9A and 9B relatively coincide with each other in a so-called in-focus condition when the shooting lens 1 forms a clear image of the object on the predicted focus plane.

Therefore, the focus detection condition of the shooting lens 1, that is, the amount and the direction of deviation from the in-focus condition, hereafter referred to as defocus amount, is determined by converting the pair of secondary images of the object formed by the focus detection optical system 8 into electric output signals through photo-electric conversion by the sensor arrays 9A and 9B of the image sensor 9 and by obtaining relative positions of the pair of secondary images of the object through computation of the pair of object image signals.

A method is also known wherein the object image signals obtained by photo-electric conversion of the image sensor 9 are filter processed to extract high frequency and low frequency components of the object image signals. The defocus amount is computed by further processing the filter processed signals.

Next, the computational processing method to obtain the defocus amount will be explained. Each of the sensor arrays 9A and 9B of the image sensor 9 is structured in such a manner that a plurality of photo-electric conversion elements line-up in one direction. Each of the sensor arrays 9A and 9B output a plurality of photo-electric conversion outputs $a_1 \ldots a_n$ and $b_1 \ldots b_n$ corresponding to the number of photo-electric conversion elements in each array (See FIGS. 5a and 5b). Correlation is performed while shifting these data strings relatively by a predetermined amount of data. In particular, the following formula is used to compute the correlation amount C(L).

$$C(L) = \sum_{i=k}^{r} |a_i - b_j| \qquad (1)$$

$$j - i = L, L = -L_{max}, \ldots, -2, -1, 0, 1, 2, \ldots L_{max}$$

Here, L is an integer representing the amount of shift of the data string, as described above, and the first term k and the last term r can be changed depending on the shift amount L. The defocus amount is computed by multiplying the shift amount yielding a relative minimum among the resulting correlation amounts C(L) and a constant determined by the pitch width of the photo-electric conversion element of the image sensor and the optical system described in FIG. 4.

However, the correlation amounts C(L) assume discrete values, as described in FIG. 5(c), and the minimum unit of detectable defocus amount is restricted by the pitch width of the photo-electric conversion elements of the sensor arrays 9A and 9B of the image sensor 9. Hence, a method is proposed (see Japanese Patent Publication No. Sho 60-37513) in which more precise focus detection is executed by computing a new relative minimum for the discrete correlation amounts C(L) using an interpolation algorithm. In this method, the defocus amount is determined based on the relative minimum of the correlation amount C(0) and the correlation amounts C(1) and C(−1) computed from the shift amounts at both sides. A shift amount $F_m$ and a defocus amount DF yielding the relative minimum correlation amount $C_{ex}$ are determined by the following formulae.

$$DF = K_f \times F_m$$

$$F_m = L + DL/E \qquad (2)$$

$$DL = [C(-1) - C(1)]/2$$

$$C_{ex} = C(0) - |DL|$$

$$E = MAX[C(1) - C(0), C(-1) - C(0) \ldots]$$

Here, MAX ($C_a$, $C_b$) denotes the larger of $C_a$ and $C_b$, while $K_f$ is a constant determined by the pitch width of the photo-electric conversion elements of the optical system and the image sensor. FIG. 6 shows a graphical representation of some of these variables. The defocus amount DF thus obtained needs to be checked to determine whether it represents a true defocus amount or if it is the result of fluctuations of the correlation amount due to noise and the like. A defocus amount satisfying the following criteria is accepted as having a sufficient confidence level.

$$E > E_1 \qquad (3)$$

$$C_{ex}/E<G1$$

where $E_1$ and $G_1$ represent certain predetermined values respectively. E is a value that depends on the contrast of the object. As the value of E becomes larger, the contrast becomes larger and the confidence level becomes higher. $C_{ex}/E$ depends on the coincidence level of the images, and the closer it is to 0, the higher the confidence level becomes. When a defocus amount is accepted as having a sufficient confidence level, the shooting lens 1 is driven based on the determined defocus amount DF. This explains the phase difference detection method.

The defocus amount of the shooting lens is detected repeatedly by executing the focus detection operation repeatedly using the above-stated focus detection method. As described above, once the defocus amount detected is accepted as having a sufficient confidence level, the shooting lens is driven based on the detected defocus amount until a defocus amount is obtained indicating that the focus condition of the shooting lens is in-focus or in a range considered to be in-focus.

Moreover, by repeating the focus detection operation, even after the defocus amount is determined to be in an in-focus condition or in a range approximately at the in-focus condition, driving of the shooting lens is resumed until a defocus amount is reached indicating that the shooting lens is determined to have exceeded the defocus amount indicating the in-focus or approximately in-focus condition. By continuing the focus detection operation in this manner, the shooting lens is always maintained in the in-focus condition.

Now, in the focus detection operation described above, the following problems occur even though the shooting lens is quick to focus on the object. For example, if the object to be focused temporarily moves out of the focus detection region due to shaking of the camera and the like, the shooting lens is driven to focus on another object (for example, the background) in the focus detection region, and then the shooting lens is re-started when the original object enters the focus detection region again. Shaking occurs easily, especially when using telephoto lenses. The fact that the shooting lens focusing is started immediately when the desired object leaves the focus detection region is not desirable since it causes a loss of picture taking opportunities. Moreover, if another object crosses between the desired object and the camera, the lens is driven to try to focus on the other object at the moment it enters the focus detection field. Then the shooting lens is re-started with an attempt to focus on the original object at the moment the other object leaves the focus detection region, causing a similar problem as above.

OBJECTS AND SUMMARY OF THE INVENTION

It is an object of the present invention to provide a focus detection adjustment device that eliminates unnecessary driving of the shooting lens once the shooting lens is driven near to an in-focus position.

This objective is achieved according to a first embodiment of the invention by a focus adjustment device comprising: a shooting lens; a focus detection optical system to guide light rays that pass through the shooting lens to a pair of photo-electric conversion element arrays; a focus detection device to detect information related to a defocus amount of the shooting lens based on output signals corresponding to a light intensity distribution of an object image from the pair of photo-electric conversion element arrays; a confidence level determination device to determine the confidence level of detected information from the focus detection device based on predetermined determination criteria; a lens driving device to drive the shooting lens based on the detected information when the detected information from the focus detection device is determined by the confidence level determination device to have a sufficient confidence level; an in-focus determination device to determine whether or not the shooting lens is driven within permissible parameters signifying an in-focus position (at or near an in-focus position); and a determination criteria altering device to alter the determination criteria so that the probability of rejecting the information of the focus detection device by the confidence level determination device for an insufficient confidence level increases when the focus detection device detects information indicating the occurrence of a defocus amount exceeding the predetermined tolerance range following a determination that the shooting lens is in a state falling within permissible parameters of an in-focus position.

This can further be achieved by adding a determination criteria easing device to ease the determination criteria so that the probability of rejecting the detected information on account of an insufficient confidence level decreases when the confidence level determination device continues to reject the detected information due to an insufficient confidence level for a specified period of time.

This can further be achieved by adding a determination criteria easing means to ease the determination criteria so that the probability of the confidence level determination means rejecting the detected information on the account of not having a sufficient confidence level decreases when the direction of movement of the object image captured by the focus detection optical system is reversed.

Additionally, the focus detection device may determine a value related to the contrast of the object image that is guided onto the photo-electric conversion element arrays. After determining such a value, the confidence level determination device may reject the detected information as having an insufficient confidence level when the determined value relating to the contrast is in a range where the contrast becomes lower than a specified reference value. The determination criteria altering device may change the specified reference value towards a range where the contrast becomes higher.

Moreover, the focus detection device may determine a value related to the coincidence level of a pair of object images that are guided onto the respective photo-electric conversion element arrays. In this case, the confidence level determination device may reject the detected information as having insufficient confidence level when the determined value relating to the coincidence level is in a range where the coincidence level becomes lower than a specified reference value. Also, the determination criteria altering device may change the reference value towards a range where the coincidence level becomes higher.

According to the invention, if a defocus amount exceeding the specified range occurs after the shooting lens is already driven to within permissible parameters signifying an in-focus position, the determination criteria of the confidence level determination device will be changed. In addition, the detected information of the focus detection device will be rejected for having an insufficient confidence level, making the probability of not executing lens driving based on the detected information higher.

Additionally, should a condition exist in which the detected information of the focus detection device continues for a specified period of time to be rejected for an insufficient confidence level, the determination criteria will be eased, making the probability of acceptance of the detected information higher.

Moreover, if the direction of the movement of the object reverses, the determination criteria of the confidence level determination device will also be eased, making the probability of acceptance of the detected information higher.

If a defocus amount exceeding a specified range occurs after the shooting lens has been already driven to within permissible parameters signifying an in-focus position, the reference criteria of the confidence level determination device is changed so as to make the contrast higher. This causes the value relating to the contrast (E) computed by the focus detection device to stay in a region with a lower contrast than the reference criteria ($E_1$) and makes the probability that the focus detection information is rejected on the account of not having a sufficient confidence level higher.

If a defocus amount exceeding the specified range occurs after the shooting lens has already been driven to within permissible parameters signifying an in-focus position, the determination criteria of the confidence level determination device can be changed so as to make the coincidence level higher, causing the value ($C_{ex}/E$) relating to the coincidence level computed by the focus detection device to stay in a region with a lower coincidence level than the reference criteria ($G_1$) and making the probability that the detected information is rejected for insufficient confidence level higher.

BRIEF DESCRIPTION OF THE DRAWINGS

The invention will be described in detail with reference to the following drawings wherein.

DETAILED DESCRIPTION OF PREFERRED EMBODIMENTS

Figure 3:
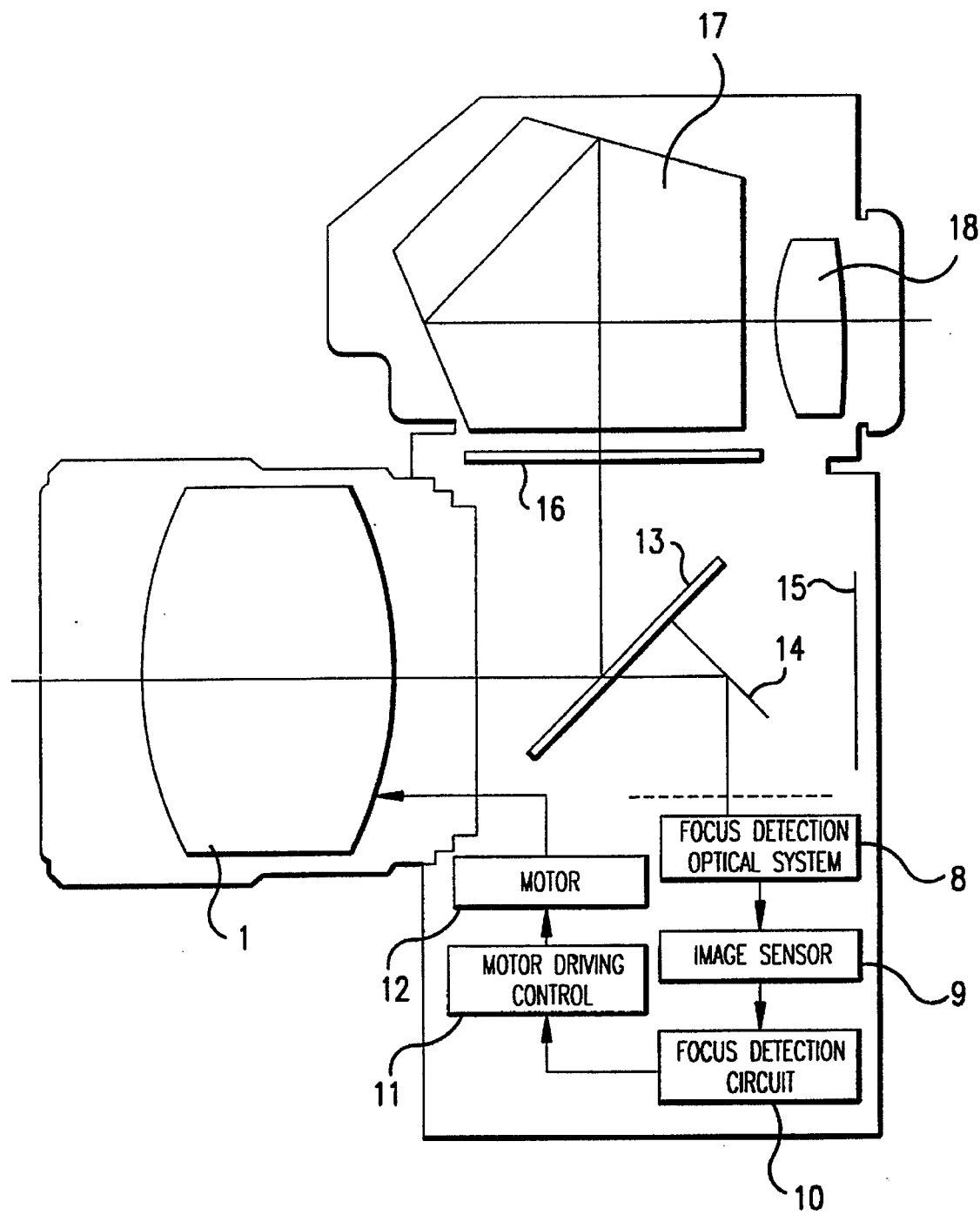
FIG. 3 shows a schematic diagram illustrating the preferred structure of the invention.

FIG. 3 is a cross section of a single lens reflex (SLR) camera comprising a focus detection device with a shooting lens 1 mounted on the camera. In FIG. 3, 10 is a focus detection circuit, 11 is a motor driving control circuit, 12 is a motor, 13 is a main mirror, 14 is a sub-mirror, 15 is a film plane, 16 is a finder screen, 17 is a penta-roof prism, and 18 is an eye lens. Here, same or equivalent parts appearing from the previously described drawings are denoted by the same symbols.

In the illustrated embodiment, the control elements, circuits 10 and 11, for simplicity have been referred to as "circuits." This is intended to encompass both hardware and software equivalents that achieve the same overall function.

For example, the "circuits" (both 10 and 11) can be implemented as a single special purpose integrated circuit (e.g., ASIC) having a main or central processing section for overall, system-level control, and separate sections dedicated to performing various different specific computations, functions and other processes under the control of the central processor section. It will be appreciated by those skilled in the art that the control elements 10 and 11 can also be implemented using a plurality of separate, dedicated or programmable integrated or other electronic circuits or devices (e.g., hardwired electronic or logic circuits, or programmable logic devices such as PLDs, PLAs, PALs or the like). Such a "circuit" can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 1–3 can be used. As shown, a distributed processing architecture, having a separate focus detection circuit 10 and a motor driving circuit 11 is preferred.

Light rays passing through the shooting lens 1 are deflected upwards by the main mirror 13 and are guided to the finder optical system comprising the finder screen 16, the penta-roof prism 17, and the eye lens 18. Photo-sensitive film is placed on the film plane 15, and, during the shooting or photographing time, the main mirror 13 and the sub-mirror 14 withdraw from the light path of the shooting lens 1 and the film plane 15, enabling light rays from the object passing through the shooting lens 1 to expose the photo-sensitive film placed on the film plane 15.

Moreover, a section of the main mirror 13 is semi-transparent, and the sub-mirror 14 is placed in the back of the semi-transparent section. The main mirror 13 deflects and guides light rays from the object that pass through the shooting lens 1 upwards to the finder optical system. Light rays from the object that pass through the semi-transparent section of the main mirror 13 are deflected by the sub-mirror 14 toward the bottom of the camera body and are guided to the focus detection optical system 8 placed in the vicinity of the film equivalent plane 6 of the shooting lens 1 and are further guided to image sensor 9, which preferably is of the charge accumulation type.

Figure 4:
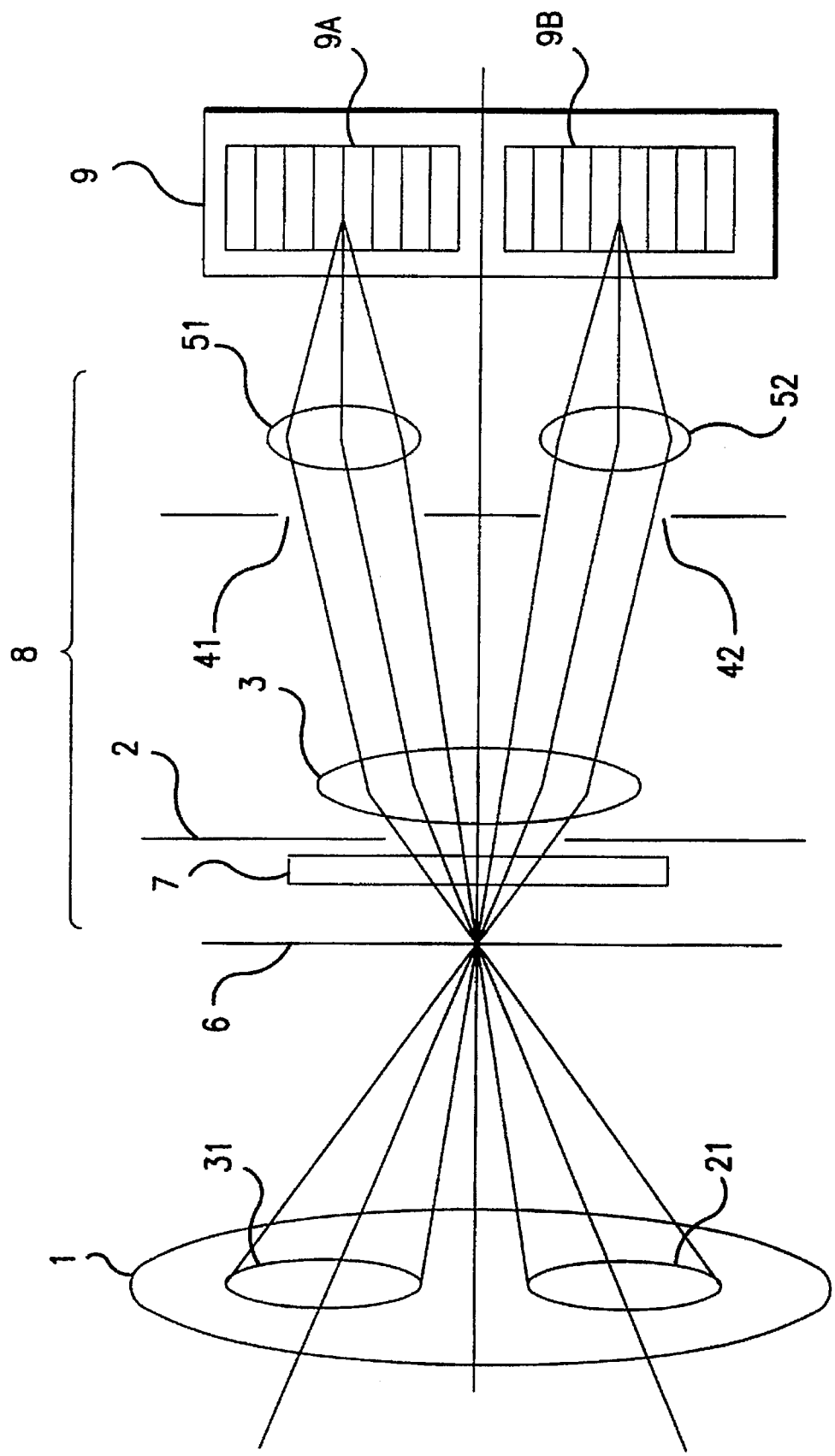
FIG. 4 shows an image sensor and an optical system of a prior art focus detection device based on a phase difference detection method.
Figure 5A:
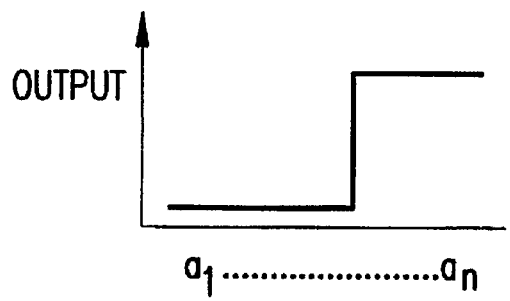
FIGS. 5 and 6 show graphs illustrating a correlation algorithm used in the prior art.
Figure 5B:
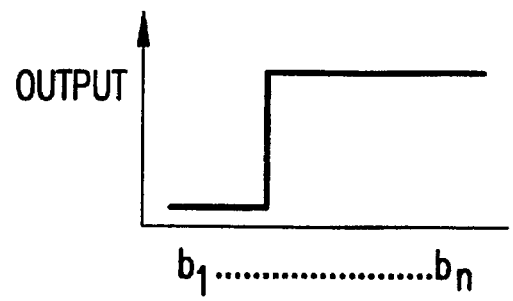
Figure 5C:
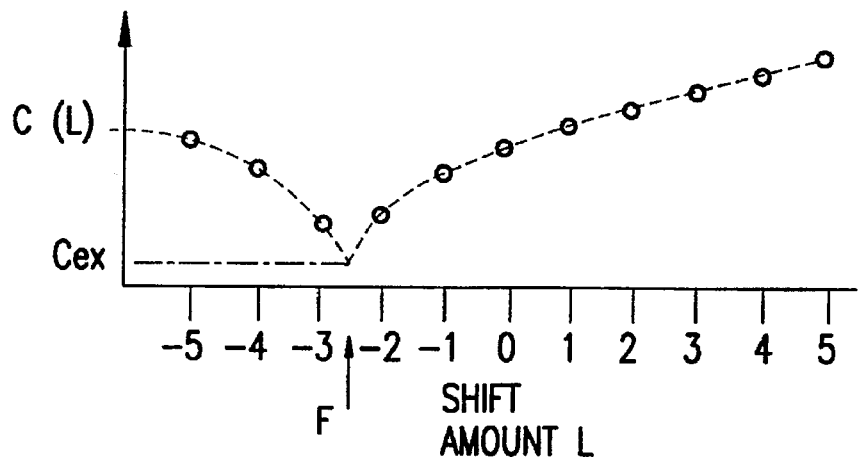
Figure 6:
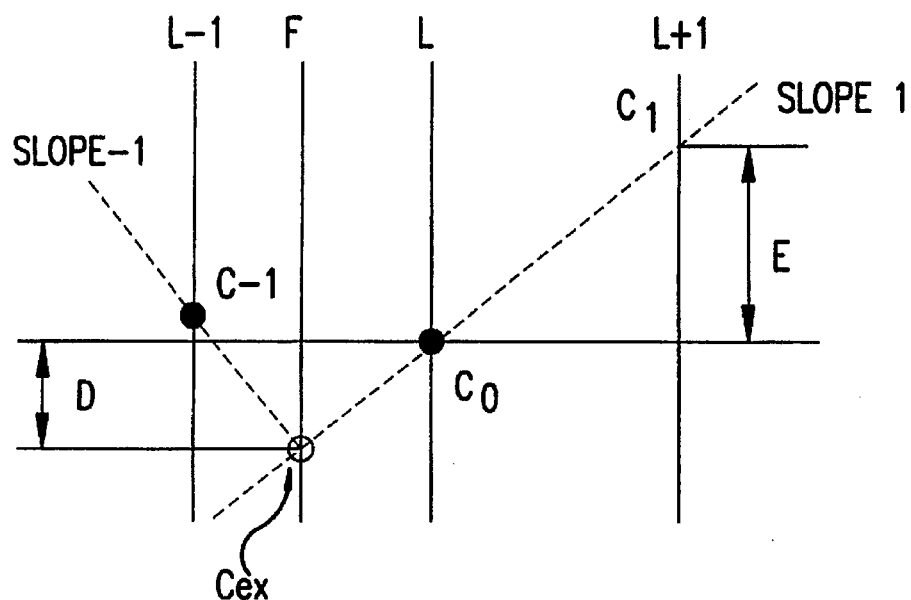

The focus detection optical system 8 and the image sensor 9 are structured in such a manner that execution of focus detection is possible in the focus detection region established on the shooting field. The image sensor 9 performs photo-electric conversion of secondary images of the object formed on the sensor arrays 9A and 9B (see FIG. 4), and generates electric signals of the object image corresponding to the intensity distribution of the object image, then sends the object image signals to the focus detection circuit 10. The focus detection circuit 10 preferably comprises a microcomputer and peripherals necessary for operation and computes a defocus amount between the imaging plane of the shooting lens 1 and the film equivalent plane 6 using a procedure to be explained later, after which circuit 10 determines a confidence level of the computed defocus amount. Based on the computed defocus amount by the focus detection circuit 10, the motor driving control circuit 11 controls the direction and the amount of driving by which the shooting lens 1 is driven to an in-focus position. The focus detection circuit 10 also comprises a filter to extract, out of the object image signals from the image sensor 9, arbitrary frequency components as focus detection signals.

Selection of a particular frequency component for focus detection is flexibly changed depending on the focus adjustment criteria, such as selecting a high frequency component if the shooting lens is near the in-focus position and selecting a low frequency component if the shooting lens is away from the in-focus position.

Figure 1:
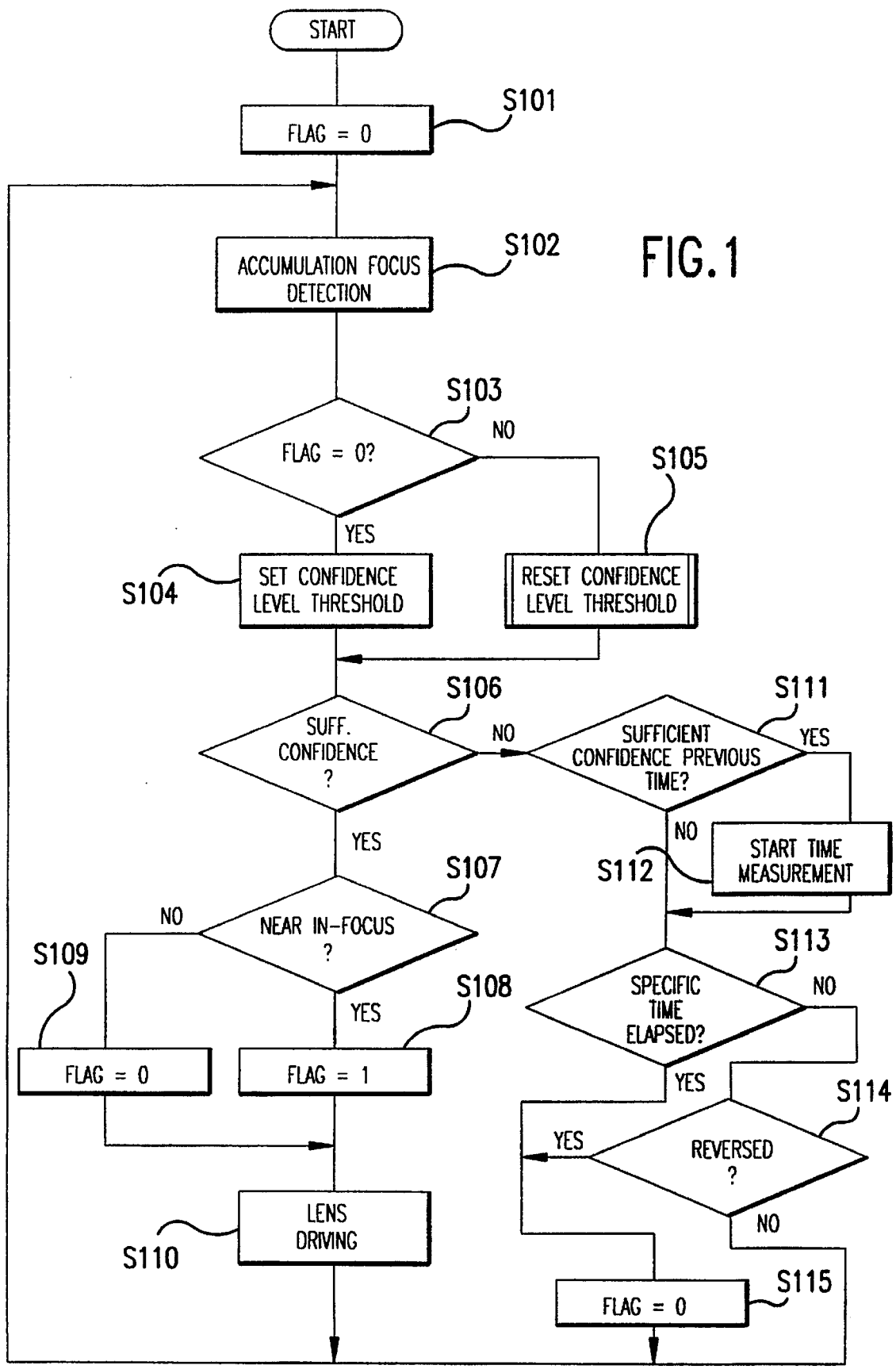
FIG. 1 shows a flow chart illustrating a focus adjustment procedure according to the present invention.

FIG. 1 illustrates a flow chart showing the focus detection process to be executed by the focus detection circuit 10. The process in the figure is started when the main power source of the camera is turned on by an unshown power switch or when a half-depression operation of an unshown release button is executed. First, at step S101, a flag is initialized (reset to 0) to indicate whether or not the shooting lens 1 is at or near the in-focus position. Next, at step S102, focus detection processes (including these procedures described by equation (1) and equation (2)) are performed after the object image signals from the image sensor 9 are read to determine (compute) a defocus amount of the shooting lens 1. Then, at step S103, the flag is checked to see if it is reset to 0. If the flag is 0, the process moves to step S104 and sets initial values for confidence level threshold values. Hereafter, the initial values will be referred to as threshold value E1 and threshold value G1 (as previously described in equation (3)). On the other hand, if the flag is set to 1, the process moves to step S105 and executes a changing of the confidence level threshold values.

Figure 2:
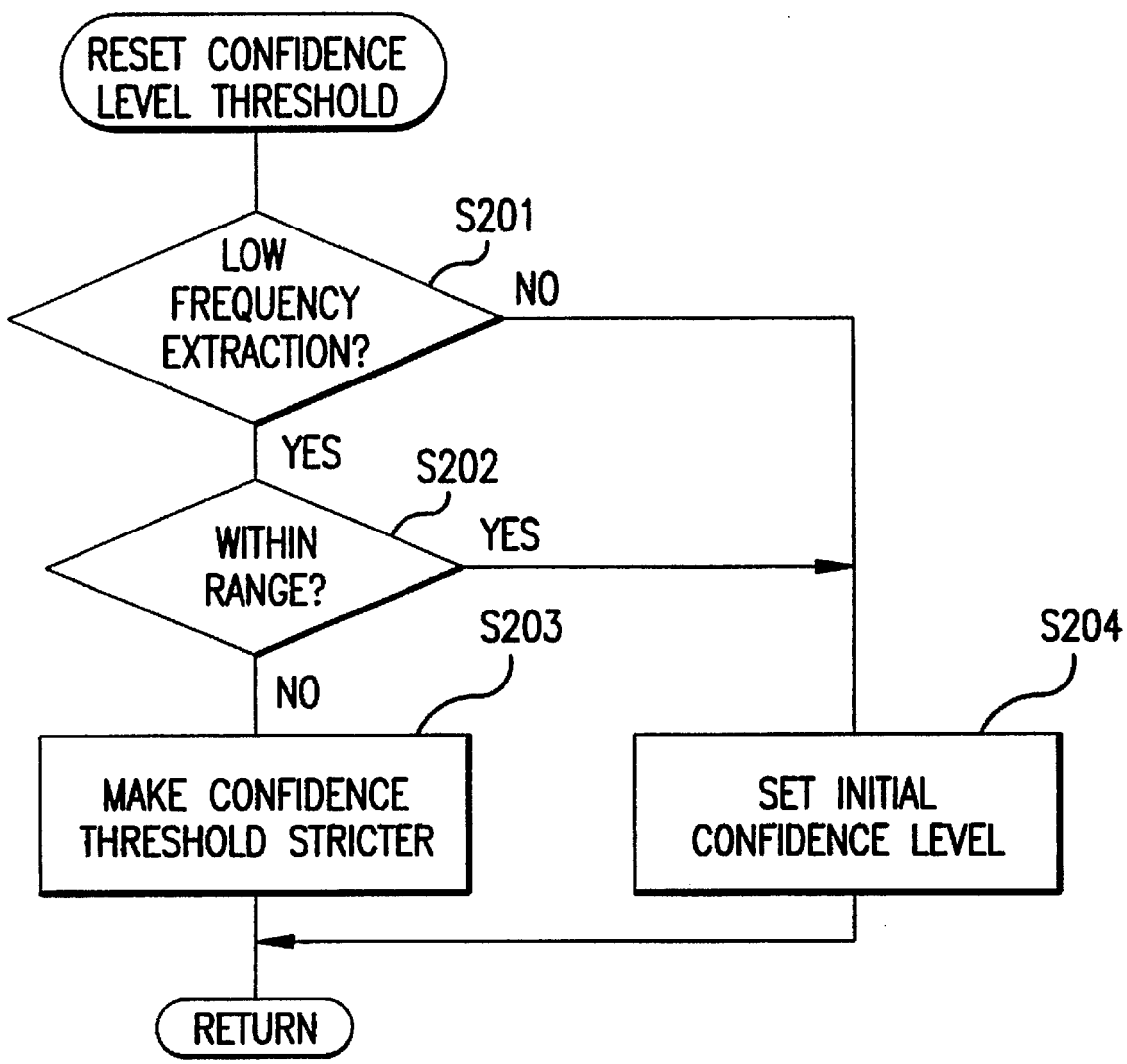
FIG. 2 shows a flow chart illustrating a confidence level threshold re-establishment process according to the invention.

During the changing process shown in FIG. 2, it is determined whether or not the immediately preceding focus detection process (step S102) has been executed using signals extracted using low frequency components of the object image signals from the image sensor 9. This is because use of the focus detection process with signals that are extracted from high frequency components of the object image signals makes the range of defocus amount detection narrow and unsuitable for the detection of a large defocus amount, such as a object moving out of the focus detection region, resulting in impossible focus detection when the defocus amount is large. If the focus detection process has been executed using signals that are extracted from low frequency components of the object image signals (step S201), the program moves to step S202, otherwise the process moves to step S204. At step S202, it is determined whether or not the computed defocus amount is within a predetermined range. This predetermined range is larger than a range surrounding the in-focus position at step S107, to be explained later. If the defocus amount is outside of the predetermined range, the process moves to step S203, otherwise the process moves to step S204. At step S203, the threshold value $E_1$ is set to a stricter value, that is, a larger value than the initial value, while at step S204, the threshold value $E_1$ is set to an initial value. After this, the process returns to the main routine and moves to step S106 in FIG. 1.

At step S106, the defocus amount determined at S102 is checked to see if it is acceptable with a sufficient confidence level using equation (3). If an acceptable or sufficient confidence level is determined, the process moves to step S107. There, it is determined whether or not the shooting lens 1 is at or near the in-focus position based on the size of the defocus amount computed at step S102 and a determination that the shooting lens is within permissible in-focus parameters. If the shooting lens 1 is at or near the in-focus position, the flag is set to 1 at step S108, otherwise the flag is reset to 0 at step S109. After steps S108 and S109, the process moves to step S110 to drive the lens 1 based on the computed defocus amount, after which the process returns to step S102 to iteratively repeat the focus detection process.

Now, the information determined at step S106 is stored in memory (unshown). The memory can be any conventional form.

If the defocus amount is determined to be rejected for having an insufficient confidence level at step S106, the process moves to step S111 where it is determined whether or not the previous computed defocus amount (from the preceding iteration of the process) was accepted as having sufficient confidence level (the previous defocus amount is stored in memory). If the previous defocus amount was determined to be accepted, the process moves to step S112 and starts a built-in timer in the focus detection circuit 10. Then, the process moves to step S113. At step S113, it is determined whether or not the measured time of the built-in timer has reached a predetermined period in seconds. If the predetermined period in seconds has elapsed, the process moves to step S115, otherwise the process advances to step S114. At step S114, the direction of movement of the object is checked to see if it has reversed. If movement has reversed, the process moves to step S115, otherwise the process returns to step S102. Here, to determine whether or not the direction of movement of the object has reversed, the signs of an image movement amount of the object image computed during the immediately preceding focus detection iteration and the image movement amount of the object image computed during the current focus detection iteration are compared. A conclusion is made that the direction has reversed if the signs are the same. Conversely, the direction has not reversed if the signs are different.

In the above process steps, upon starting the focus adjustment process, the flag is first reset to 0, and at step S104 the threshold value E1 is set to an initial value. Then, when the shooting lens 1 is driven to the in-focus position or near the vicinity of the in-focus position, the flag is set to 1 at step S108. If a computed defocus amount based on low frequency components of the object image signals later exceeds the predetermined range, the threshold value E1 is replaced with a larger value, making the probability higher of returning to step S102 without executing lens driving, as a result of rejection of the defocus amount for an insufficient confidence level at step S106. Thus, erroneous driving of the shooting lens to focus on other objects, such as the background, will be avoided even if a large defocus amount occurs, such as due to the object moving out of the focus detection region.

As long as the computed defocus amount, after the shooting lens 1 is driven to the in-focus position or near the in-focus position, remains within the predetermined range, the threshold value E1 maintains the initial value set at step S204. This is because in the case of a large defocus amount, such as the object moving out of the focus detection region, prevention of driving of the shooting lens is urgently needed. Whereas, in the case of an inexcessively large defocus amount, such as changing of the object to be focused as a result of changing the composition, immediate driving of the shooting lens to focus is urgently needed.

Moreover, if the defocus amount continues for a predetermined period of time to be rejected for an insufficient confidence level value after the shooting lens 1 is driven to the in-focus position or near the in-focus position, step S113 is affirmed. The flag is reset to 0 at step S115, and the threshold value E1 is reset to the initial value at step S104. Thus, even when the object to be focused is changed intentionally with changing of the composition and the like, the shooting lens 1 will not be left stopped due to the continuous condition in which the defocus amount has been rejected for insufficient confidence level. If the direction of movement of the object is determined to have been reversed, the threshold value E1 is also reset to the initial value, but this is for the following reason. If the object is a moving body, the shooting lens is driven to track the movement, and sometimes the defocus amount becomes large, as when the object is moved out of the focus detection region. This will be explained further in reference to FIG. 7.

Figure 7:
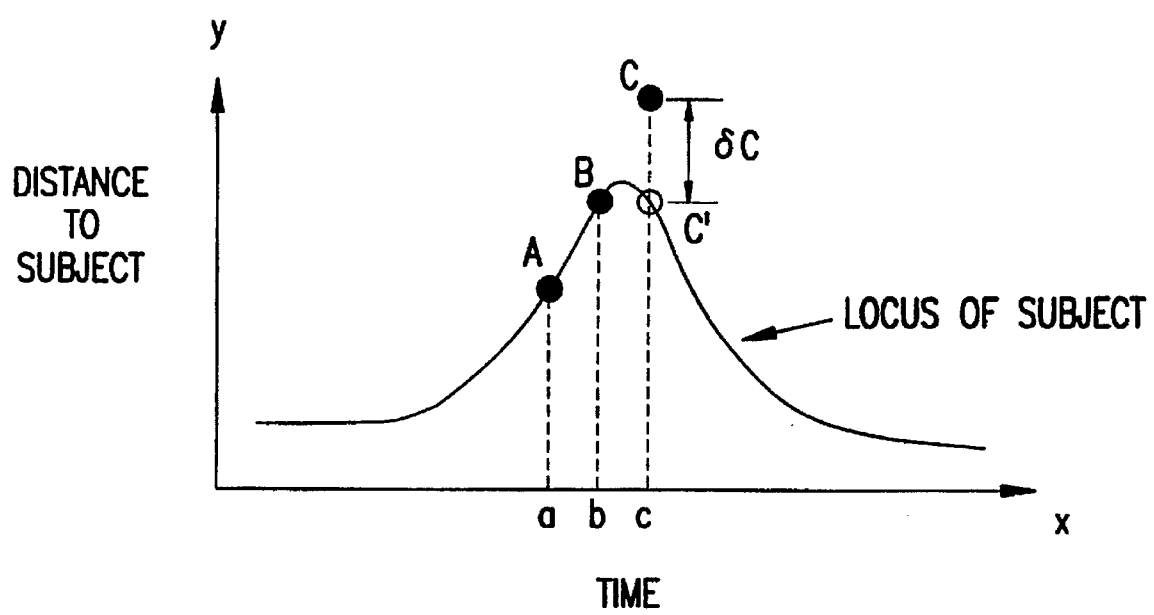
FIG. 7 shows a graph illustrating problems caused by reversal of the direction of motion of an object.

In FIG. 7, the x-axis represents time and the y-axis represents the distance from the camera to the object. The higher the point is along the y-axis, the closer the object is to the camera. The real line, forming a mountain shape, describes the locus of the object. The object is getting closer to the camera until the peak of the mountain, which is the closest point to the object. After the peak, it moves farther away from the camera. The solid circles A, B, and C represent the position of the shooting lens with respect to the object at times a, b, and c. In other words, a solid circle on the locus of the object indicates that the shooting lens is at the in-focus position, while a solid circle off the locus indicates the shooting lens is out of focus, with deviation from the focus becoming larger (the defocus amount becoming larger) with the distance from the curve.

If the object is a moving body, the next driving amount of the shooting lens is predicted from the focus detection information of the previous two consecutive times. To explain this using FIG. 7, first assume that the shooting lens is in the in-focus position at times a and b, then the line connecting the solid circles A and B, which show the respective lens positions, represents the velocity of the moving object. Now supposing the object moves with the same speed from time b to c as in time a to b, the position of the object at time c is predicted to be the solid circle C, and the shooting lens is driven tentatively to this position. However, in reality, the object changes the direction of its movement, reaching the position closest to the camera after time b and moving away gradually at time c, resulting in an actual focus position at time c shown as white open circle C', creating the shift δC from the lens position obtained by tentative driving.

If the direction of movement of the object reverses between two consecutive points, as in the case where the object approaches the camera at time b but moves away at time c, a large amount of shift (defocus amount) occurs between the position of a shooting lens driven tentatively and the actual position of the object. In the processes of FIG. 1 and FIG. 2, described above, if a defocus amount larger than the predetermined amount is detected after the shooting lens is already driven to within permissible in-focus parameters (at or near the in-focus position), the threshold value $E_1$ is made stricter during a specified period of time; hence, assuming that the process at step S114 does not occur, reversing of the direction of movement of the object alone, without the object moving out of the focus detection range, causes the detected defocus amount to become larger than the predetermined amount and the threshold value $E_1$ to become large. This results in rejection of the defocus amount on the account of an insufficient confidence level, which in turn stops the driving of the lens and causes failure in tracking the moving body accurately. In order to avoid such an inconvenience, the present embodiment resets the threshold value $E_1$ to the initial value immediately after the reversal of the direction of movement of the object.

In the embodiment described above, whether or not the defocus amount is within the range of the predetermined amount is determined at step S202, other values can be used instead, so long as determination of whether or not a defocus amount exceeding a certain amount occurs is made properly.

For example, the threshold value $E_1$ can be made large if the shift amount $F_m$ in equation (2) exceeds the predetermined range. The setting of the threshold value $E_1$ can be changed to any other value as long as determination of whether or not the defocus amount exceeding a certain amount occurs is made properly. Moreover, instead of the threshold value $E_1$, the threshold value $G_1$ can be made stricter, that is, the same effect is obtained by making the threshold value $G_1$ smaller. Alternatively, the threshold value $E_1$ can be made larger while at the same time making the threshold value $G_1$ smaller.

Determination of whether or not the shooting lens 1 is within the permissible parameters signifying an in-focus position can be realized by defining the vicinity of the in-focus position to be the difference between the defocus amount and the subsequent lens driving amount contained in a specified range regardless of the size of the very defocus amount computed.

In the present invention, if a large defocus amount occurs after the shooting lens is driven to the in-focus position or near the in-focus position, the determination criteria are changed to increase the probability of rejecting the information of the focus detection for an insufficient confidence level, thus enabling control of unnecessary motion of the shooting lens in the case when the object moves out of the focus detection region temporarily due to shaking and the like. Moreover, because the determination criteria can be eased when the rejection of the detected information continues for a predetermined period of time, after the determination criteria are altered, focus adjustment operation for a new object can be started without certain additional operations when the object to be focused is changed intentionally. Additionally, tracking of the object can be improved by releasing interruption of lens driving when the direction of movement of the object is reversed. Additionally, the confidence level of the focus detection information can be determined accurately by taking the level of contrast of the object image on the pair of photo-electric conversion element arrays or the level of coincidence of the object images on the pair of photo-electric conversion element arrays into consideration.

The invention has been described with reference to the preferred embodiments thereof, which are illustrative and not limiting. Various changes may be made without departing from the spirit and scope of the invention as defined in the appended claims.

What is claimed is:

1. A focus adjustment device operating in a continuous focus mode comprising:

a shooting lens;

a pair of photo-electric conversion element arrays;

a focus detection optical system disposed between the shooting lens and the photoelectric conversion element arrays that guides light rays passing through the shooting lens to the photoelectric conversion element arrays;

a focus detection section in connection with the photo-electric conversion element arrays to detect information related to a defocus amount of the shooting lens based on output signals corresponding to a light intensity distribution of an object image from the pair of photo-electric conversion element arrays;

a confidence level determination section in connection with the focus detection section to determine a confidence level of detected information from the focus detection device based on predetermined determination criteria;

a lens driving section in connection with the confidence level determination section to drive the shooting lens based on the detected information when the detected information from the focus detection section is determined by the confidence level determination section to have a sufficient confidence level;

an in-focus determination section in connection with the focus detection section to determine whether or not the shooting lens is driven within permissible parameters signifying an at or near in-focus position; and a determination criteria altering section in connection with the confidence level determination section and the in-focus determination section to alter the predetermined determination criteria so that a probability of rejecting the information from the focus detection section by the confidence level determination section for an insufficient confidence level increases when the focus detection section detects information indicating an occurrence of a defocus amount exceeding a predetermined tolerance range following a determination that the shooting lens is in a state falling within permissible in-focus parameters.

2. The focus adjustment device according to claim 1, further comprising a determination criteria easing section in connection with the confidence level determination section and the in-focus determination section to ease the determination criteria so that the probability of rejecting the detected information due to a lack of confidence decreases when the confidence level determination device continues to reject the detected information for having an insufficient confidence level for a specified period of time.

3. The focus adjustment device according to claim 1, further comprising a determination criteria easing section to ease the predetermined determination criteria so that the probability of the confidence level determination device rejecting the detected information for an insufficient confidence level decreases when a direction of movement of the object image captured by the focus detection optical system is reversed.

4. The focus adjustment device according to claim 1, wherein the focus detection section determines a value related to contrast of the object image guided onto the photo-electric conversion element arrays and the confidence level determination section rejects the detected information for having an insufficient confidence level when the value related to contrast is in a range lower than a specified reference value, and the determination criteria altering section changes the specified reference value so that an acceptable contrast range becomes higher.

5. The focus adjustment device according to claim 1, wherein the focus detection section determines a value related to a coincidence level of a pair of object images guided onto respective ones of the photo-electric conversion element arrays, wherein the confidence level determination section rejects the detected information for an insufficient confidence level when the value related to the coincidence level is in a range lower than a specified reference value, and the determination criteria altering section changes the specified reference value toward a range where the acceptable coincidence level becomes higher.

6. A focus adjustment assembly for controlling driving of a shooting lens operating in a continuous focus mode, comprising:

a shooting lens;

image sensor means for converting a photographic object image formed of light rays that have passed through the shooting lens into signals corresponding to intensity distribution of the object image;

focus detection means coupled to the image sensor means for receiving the signals and detecting information related to a defocus amount between an imaging plane of the shooting lens and a film equivalent plane;

a confidence level determining means in connection with the focus detection means for determining a confidence level of detected information from the focus detection means based on predetermined determination criteria;

lens driving means coupled to the focus detection means for controlling direction and amount of driving of the shooting lens into an in-focus position based on the detected information when the detected information is determined by the confidence level determining means to have a sufficient confidence level;

an in-focus determination means in connection with the focus detection means for determining whether or not the shooting lens is driven within permissible parameters signifying an at or near in-focus position; and determination criteria altering means in connection with the confidence level determination means and the in-focus determination means for altering the predetermined determination criteria so that a probability of rejecting the information from the focus detection means by the confidence level determination means for having an insufficient confidence level increases when the focus detection means detects information indicating an occurrence of a defocus amount exceeding a predetermined tolerance range following a determination that the shooting lens has been in a state falling within permissible in-focus parameters.

7. A method of adjusting the focus of an optical device, operating in a continuous focus mode, having a shooting lens, a focus detection optical system to guide light rays which pass through the shooting lens to a pair of photo-electric conversion element arrays, a focus detection section to detect information related to a defocus amount of the shooting lens based on output signals corresponding to a light intensity distribution of an object image from the pair of photo-electric conversion element arrays, a confidence level determining section having predetermined determination criteria, and a lens driving section to drive the shooting lens, the method comprising the steps of:

(a) using the photo-electric conversion element arrays to obtain object image signals;

(b) determining, in the focus detection section, a defocus amount of the shooting lens based on the object image signals;

(c) determining whether the shooting lens has been previously determined to be within permissible parameters of an in-focus position;

(d) setting initial confidence level threshold criteria when step (c) indicates that the shooting lens was not previously determined to be within permissible parameters of an in-focus position;

(e) changing confidence level threshold criteria when step (c) indicates that the shooting lens was previously determined to be within permissible parameters of an in-focus position by altering one or more criteria of the confidence level determining section so that the probability of rejecting the information detected by the focus detection section based on an insufficient confidence level increases when the information indicates that the defocus amount exceeds a predetermined tolerance;

(f) checking the defocus amount to determine if the defocus amount has a sufficient confidence level based on the predetermined criteria;

(g) determining whether the shooting lens is at or near the in-focus position based on the size of the defocus amount; and (h) driving the shooting lens if the defocus amount has a sufficient confidence level.

8. The method of claim 7, further including setting of an in-focus flag to a first value after step (g) if the shooting lens is determined to be within permissible parameters of an in-focus position and setting of the in-focus flag to a second value after step (g) if the shooting lens is determined to not be within permissible parameters of an in-focus position.

9. The method of claim 7, wherein the criteria comprises a predetermined component having a threshold value E1 corresponding to contrast of the object and step (e) includes altering threshold value E1 so that the probability of rejecting the detected information increases when the information indicates that the defocus amount exceeds the predetermined tolerance.

10. The method of claim 7, wherein the criteria comprises a predetermined component having a threshold value G1 corresponding to a coincidence level of the object image and step (e) includes altering threshold value G1 so that the probability of rejecting the information detected increases when the information indicates that the defocus amount exceeds the predetermined tolerance.

11. The method of claim 7, wherein the criteria comprises a predetermined component having a threshold value E1 corresponding to contrast of the object and a predetermined component having a threshold value G1 corresponding to a coincidence level of the object image and step (e) includes altering at least one of the threshold values E1 and G1 so that the probability of rejecting the information detected increases when the information indicates that the defocus amount exceeds the predetermined tolerance.

12. The method of claim 7, wherein step (e) alters the criteria so that a determined defocus amount representative of the object leaving a detection region of the focus detection optical system results in altered criteria that allow rejection of the information based on an insufficient confidence level so that the shooting lens is not erroneously driven based on the determined defocus amount.

13. The method of claim 7, further comprising the step of easing the criteria so that the probability of rejecting the information for insufficient confidence level decreases when the information continues to be rejected for insufficient confidence for a specified period of time.

14. The method of claim 13, wherein upon determination of an insufficient confidence level, an immediately preceding confidence level is checked, and, upon determination that the preceding confidence level was sufficient, a step of initiating a timer is started.

15. The method of claim 14, further comprising the step of determining whether a specified time has elapsed on the timer.

16. The method of claim 15, further comprising the step of checking to see if the object image has reversed its movement direction if the specified time has not elapsed.

17. The method of claim 14, further comprising a step of setting the in-focus flag to a predetermined value when the object image is determined to have reversed its direction.

18. The method of claim 7, further comprising the step of easing the criteria so that the probability of rejecting the information for insufficient confidence level decreases when a movement direction of the object image captured by the focus detection optical system is reversed.

19. The method of claim 7, further comprising the step of filtering out high or low frequency components of the image signals.

20. The method of claim 19, further comprising the step of determining whether the information includes extracted low frequency components and setting an initial confidence level when it is determined that extracted low frequency components are not present.

* * * * *